(12) United States Patent (10) Patent No.: US 9,231,702 B2
Buelow (45) Date of Patent: Jan. 5, 2016

(54) OPTICAL MIMO PROCESSING

(71) Applicant: Alcatel Lucent, Paris (FR)

(72) Inventor: Henning Buelow, Kornwestheim (DE)

(73) Assignee: Alcatel Lucent, Boulogne-Billancourt (FR)

( * ) Notice: Subject to any disclaimer, the term of this patent is extended or adjusted under 35 U.S.C. 154(b) by 0 days.

(21) Appl. No.: 14/356,214

(22) PCT Filed: Nov. 6, 2012

(86) PCT No.: PCT/EP2012/071903
§ 371 (c)(1),
(2) Date: May 5, 2014

(87) PCT Pub. No.: WO2013/079281
PCT Pub. Date: Jun. 6, 2013

(65) Prior Publication Data
US 2014/0286648 A1  Sep. 25, 2014

(30) Foreign Application Priority Data

Nov. 28, 2011 (EP) .................................. 11290543

(51) Int. Cl.
*H04B 10/2581* (2013.01)
*G02B 6/28* (2006.01)

(52) U.S. Cl.
CPC .......... *H04B 10/2581* (2013.01); *G02B 6/2808* (2013.01)

(58) Field of Classification Search
CPC .......................... H04B 10/2581; G02B 6/2808
USPC ...................... 398/44, 83, 142–144
See application file for complete search history.

(56) References Cited

U.S. PATENT DOCUMENTS 6,304,352 B1 * 10/2001 Cunningham et al. ........ 398/139
2004/0234203 A1   11/2004 Tabuchi et al.

(Continued)

FOREIGN PATENT DOCUMENTS

EP  2333990  6/2011
EP  2372420  10/2011

(Continued)

OTHER PUBLICATIONS

Schollmann, S. et al; 10.7 Gb/s Over 300 m GI-MMF Using a 2×2 MIMO System Based on Mode Group Diversity Multiplexing; Optical Fiber Communication Conference and Exposition National Fiber Optic Engineers Conference; OFCNFOEC 2007; Mar. 25-29, 2007; Anaheim, CA, USA; IEEE, Piscataway, NJ, USA; vol. 1, Mar. 25, 2007; pp. 1-3; XP002626619; DOI: 10.1109/OFC.2007.4348820; ISBN: 978-1-55752-831-5.

(Continued)

*Primary Examiner* — Dalzid Singh

(74) *Attorney, Agent, or Firm* — Patti & Maivone Law Group, LLC

(57) ABSTRACT

A technique is provided for an optical multiple input multiple output (MIMO) processing system. The optical (MIMO) processing system includes an interface to a multi-mode fiber at a first end of the optical processing system; M first single-mode waveguides coupled to the interface; wherein the first waveguides are arranged to carry M first optical signals, respectively; N second single-mode waveguides at a second end of the optical processing system, wherein the second waveguides are arranged to carry N second optical signals, respectively, wherein the N second optical signals are associated with N modes carried by the multi-mode fiber; and an optical processing core arranged to transform the first optical signals into the second optical signals such that a correlation between the second optical signals is decreased compared to a correlation between the first optical signals using a plurality of optical couplers for coupling each of the M first optical signals with one another, such that each of the N second optical signals is a linear combination of all of the M first optical signals.

15 Claims, 13 Drawing Sheets

(56) References Cited

U.S. PATENT DOCUMENTS

| | | | |
|---|---|---|---|
| 2007/0031087 A1 | 2/2007 | Miyadera et al. | |
| 2010/0196005 A1* | 8/2010 | Wada et al. | 398/45 |
| 2010/0329671 A1* | 12/2010 | Essiambre et al. | 398/44 |
| 2012/0121220 A1* | 5/2012 | Krummrich | 385/28 |

FOREIGN PATENT DOCUMENTS

| | | |
|---|---|---|
| EP | 2372420 A1 * | 10/2011 |
| JP | 2006251429 | 9/2006 |

OTHER PUBLICATIONS

Salsi, M. et al; Transmission at 2×100Gb/s, over Two Modes of 40km-long Prototype Few-Mode Fiber, using LCOS-based Mode Multiplexer and Demultiplexer; OSA/OFC/NFOEC 2011; OFC 2011, PDPB9.

Bulow, H. et al; Stable Coherent MIMO Transport over Few Mode Fiber Enabled by an Adiabatic Mode Splitter; ECOC 2010; Sep. 19-23, 2010; Torino, Italy; P4.04; 978-1-4244-8535-2/10; 2010 IEEE.

Bulow; H. et al; High Bit-Rate MIMO Transport over Multimode Fiber; The 16th Opto-Electronics and Communications Conference, OECC 2011; Jul. 4-8, 2011; Kaohsiung, Taiwan; pp. 413-414.

Doerr, C. R. et al; Silicon Photonics Core-, Wavelength-, and Polarization-Diversity Receiver; IEEE Photonics Technology Letters, vol. 23, No. 9, May 1, 2011, pp. 597-599.

Mortimore, D.B.; Theory and fabrication of 4×4 single-mode fused optical fiber couplers; Applied Optics, vol. 9, No. 3, Jan. 20, 1990; pp. 371-374; Optical Society of America 1990.

Bulow, H. et al; Coherent Multimode-Fiber MIMO Transmission with Spatial Constellation Modulation; Proceedings of the ECOC, European Conference and Exhibition on Optical Communication (2011); ECOC Technical Digest 2011 OSA.

Tarighat, A. et al; Fundamentals and Challenges of Optical Multiple-Input Multiple-Output Multimode Fiber Links; IEEE Communications Magazine; May 2007; pp. 57-63.

Noordegraaf, D. et al; Optics Express 1988, vol. 17, No. 3, Feb. 2, 2009; pp. 1988-1994; OSA 2009.

\* cited by examiner

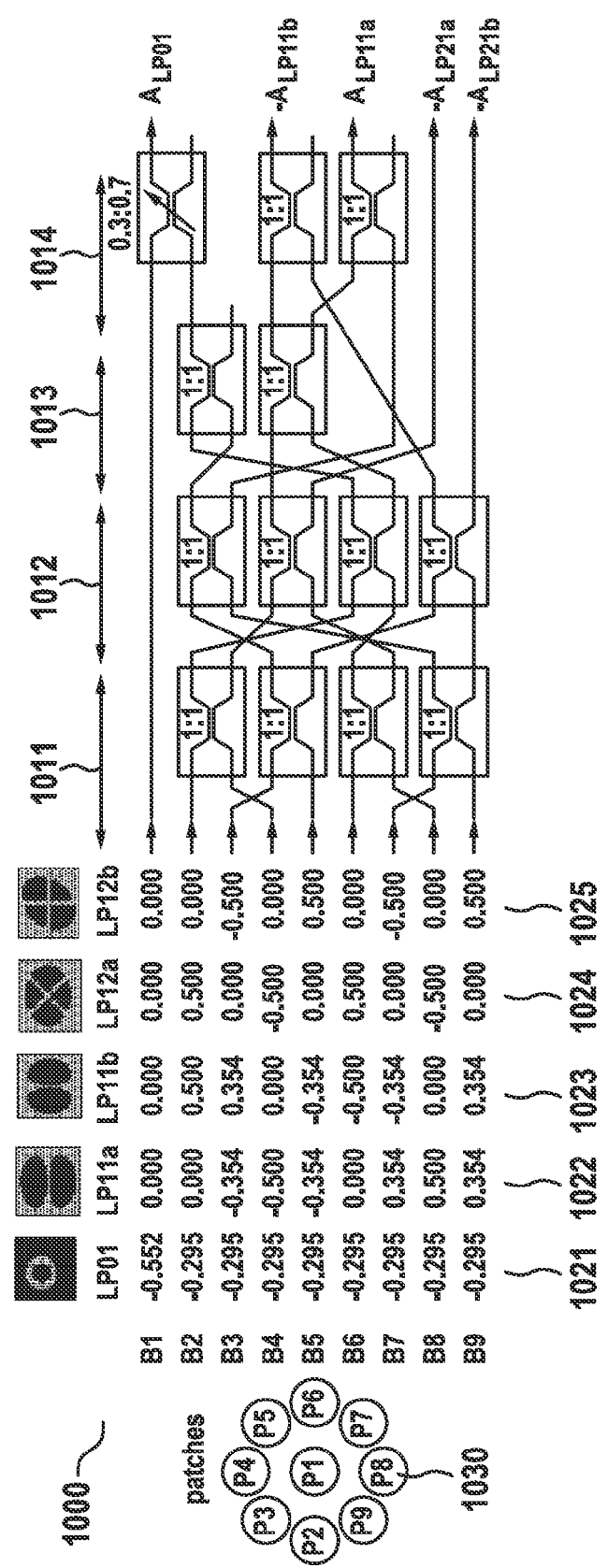

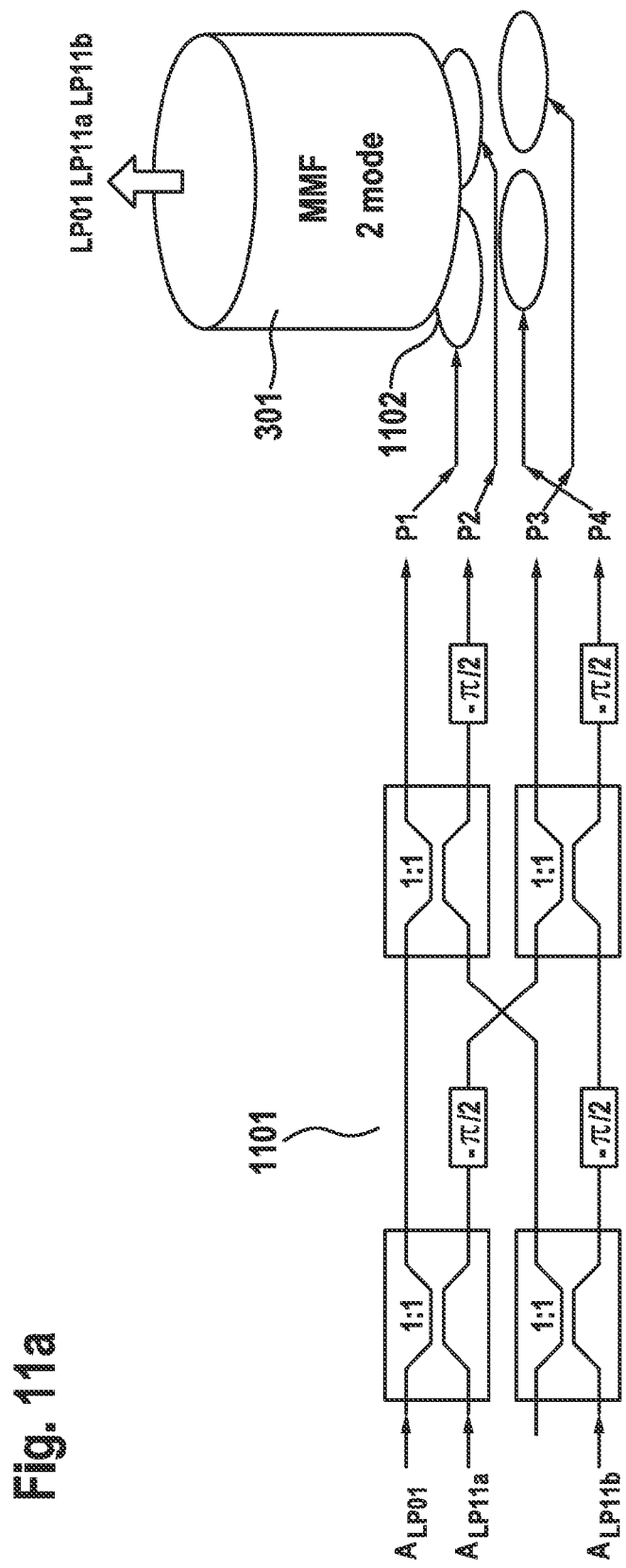

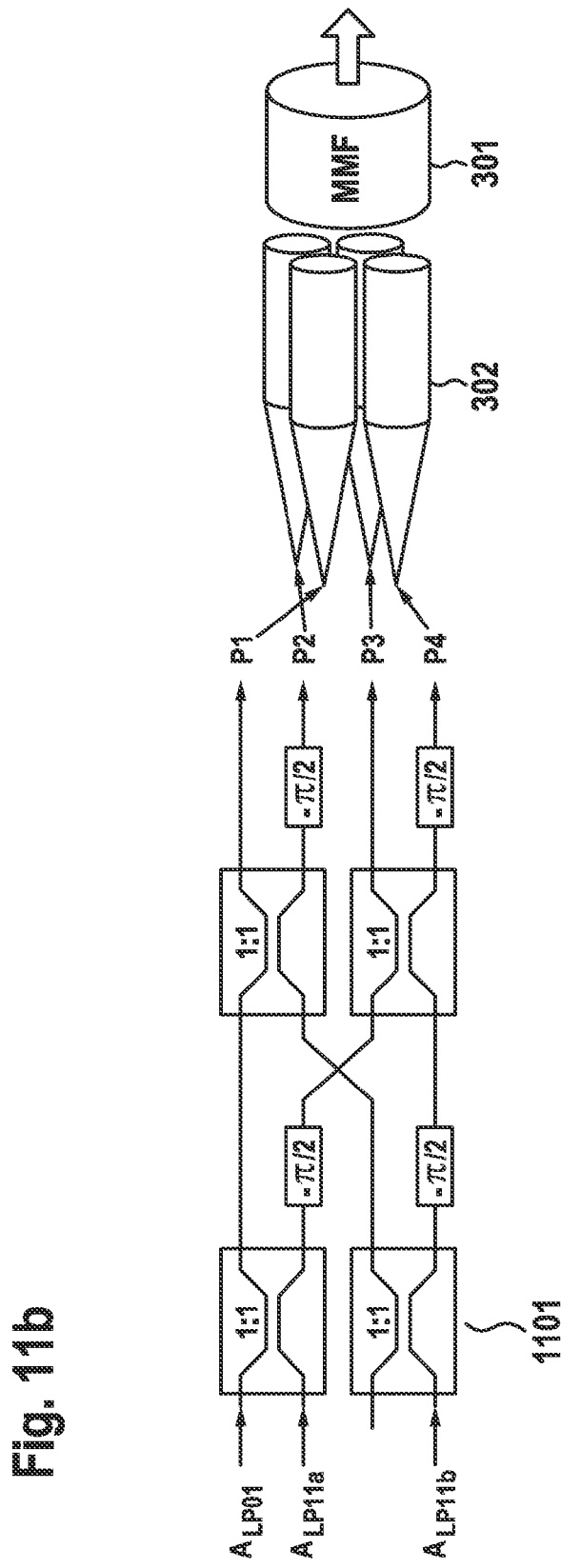

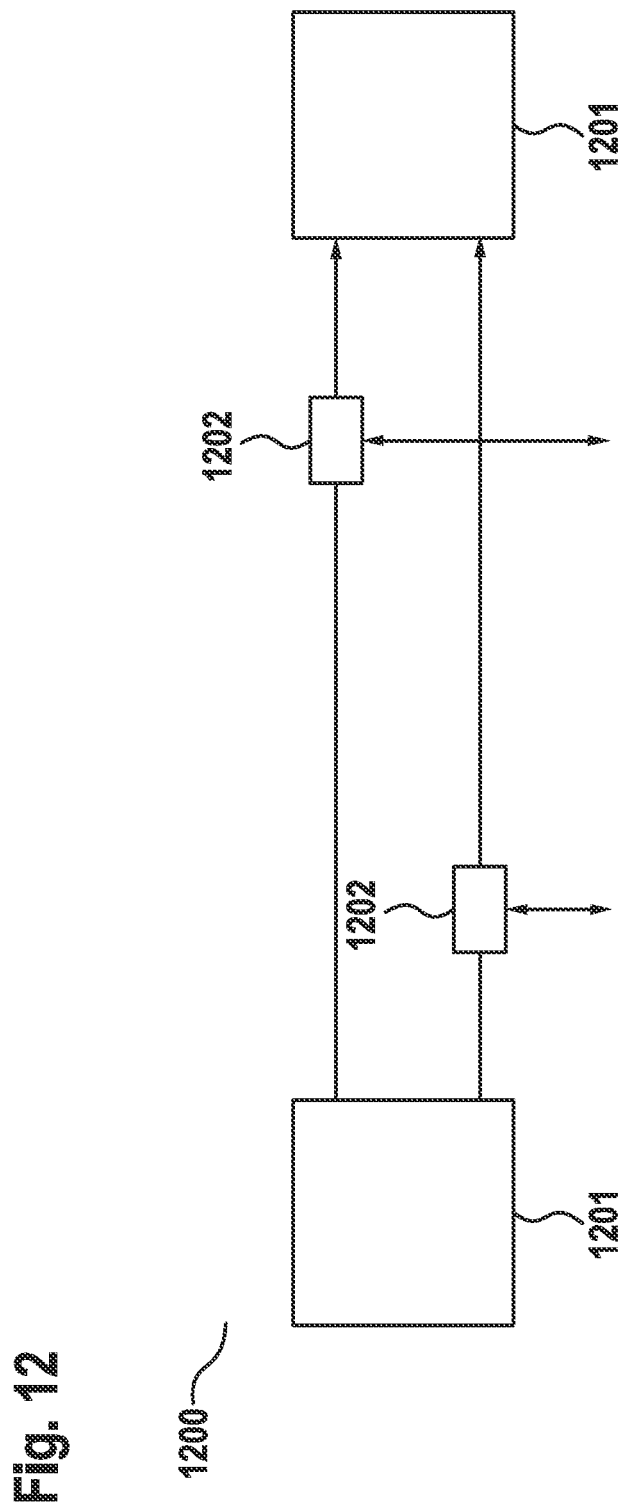

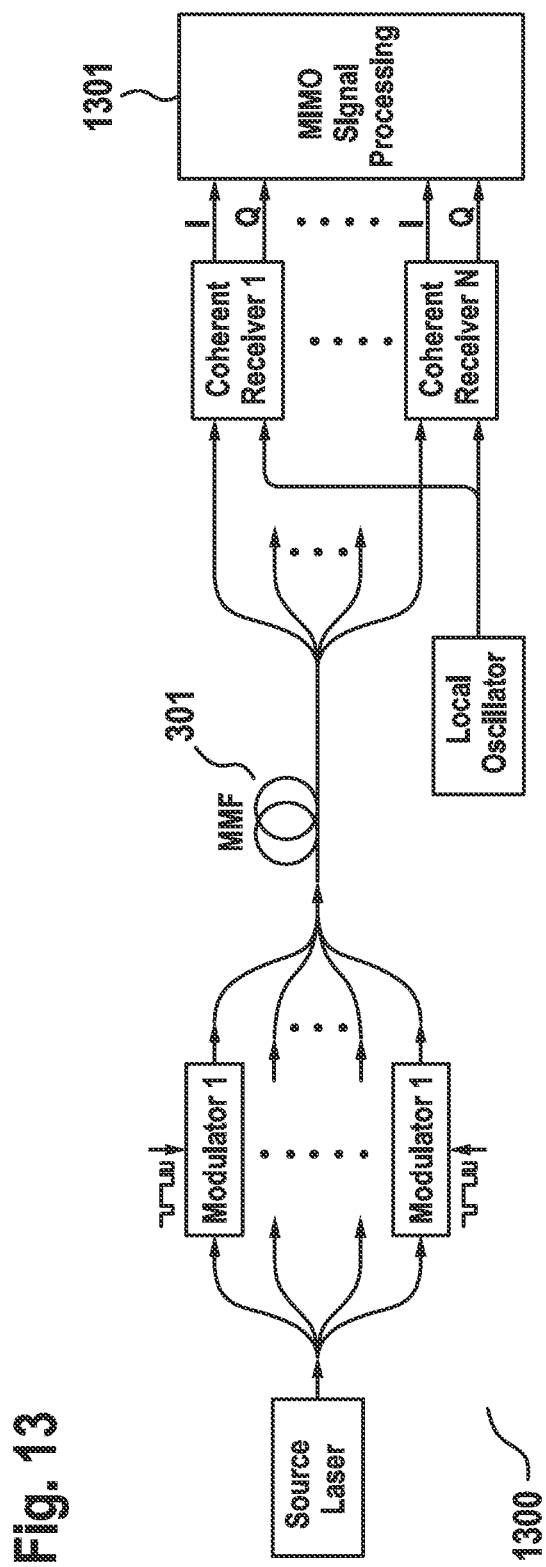

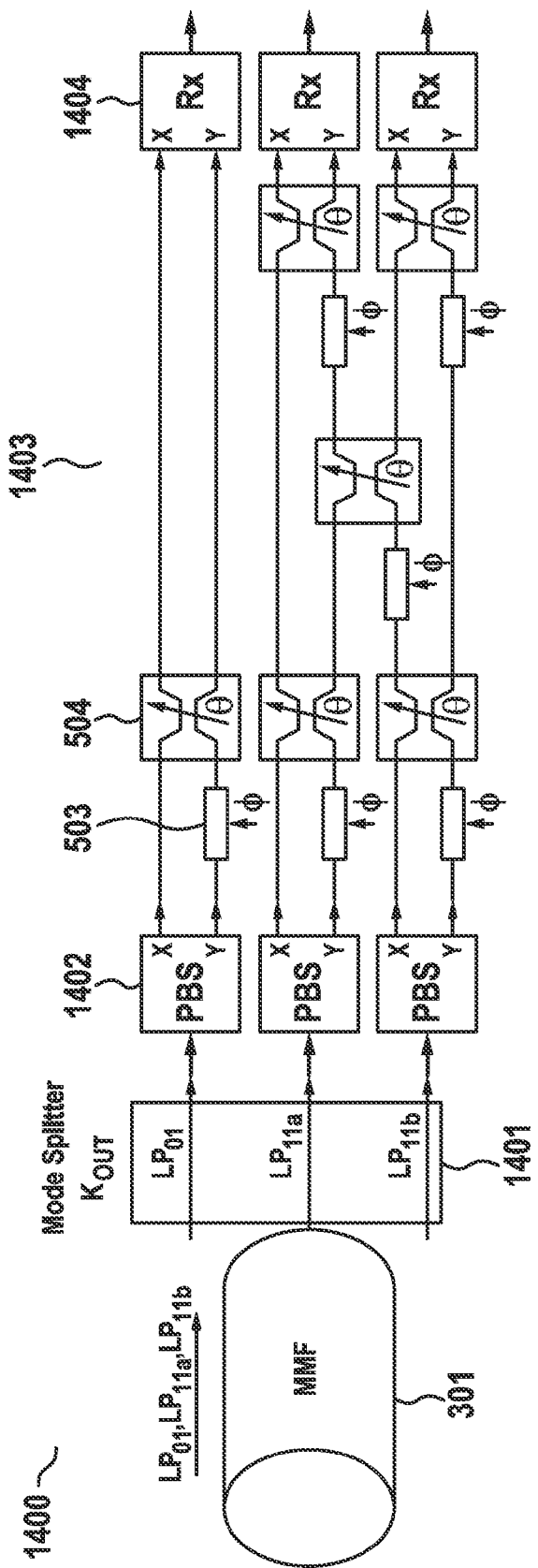

OPTICAL MIMO PROCESSING

TECHNICAL FIELD

The present document relates to optical communication systems. In particular, the present document relates to an optical signal processor for multiple input multiple output (MIMO) processing at multimode fibers (MMF).

BACKGROUND

Multi Gigabit/s optical transmissions systems have been proposed which multiplies the capacity (bit/s) transported over an optical fiber (within a given spectrum) by moving to a multimode fiber (MMF) and by transporting different data channels over the different spatial modes (and possibly the different polarization modes) of the MMF. In other words, mode division multiplexing (MDM) over multimode fiber (MMF) is investigated as one of the options to overcoming the capacity limits of standard single-mode fibers (SMF).

SUMMARY

In order to enable MDM over MMF, various subsystems of the optical transmission system, such as optical MMF amplifiers and spatial mode multiplexers/demultiplexers (SM DE/MUX) as well as MIMO processors, have to be provided. The present document describes various architectures which may be used to provide efficient optical signal processors to implement some or all of the required subsystems of an optical MDM over MMF communication system.

According to an aspect, an optical processing system, e.g. an optical multiple input multiple output (MIMO) processing system, is described. The optical processing system may be used in conjunction with a multi-mode fiber adapted to carry a plurality of optical (spatial and/or polarization) modes. For this purpose, the optical processing system may comprise an interface to the multi-mode fiber at a first end of the optical processing system. Furthermore, the optical processing system may comprise M first single-mode waveguides, M>2 (e.g. M>3 or 4 or 5 or 6 or 7 or 8 or 9), at the first end of the optical processing system. The M first waveguides may be coupled to the interface to the multi-mode fiber. The first waveguides are adapted to carry M first optical signals, respectively. Furthermore, the optical processing system comprises N second single-mode waveguides, N>1 (e.g. N>2 or 3 or 4 or 5 or 6 or 7 or 8 or 9), at a second end of the optical processing system. The second waveguides are adapted to carry N second optical signals, respectively, wherein the N second optical signals are associated with N (spatial and/or polarization) modes carried by the multi-mode fiber. M may be greater or equal to N.

Furthermore, the optical processing system comprises an optical processing core adapted to transform the first optical signals into the second optical signals. For this purpose, the optical processing core may comprise a plurality of optical processing components (also referred to as optical processing units) which are adapted to manipulate the optical signals carried by one or more waveguides within the optical processing core. In particular, the optical processing core may comprise a plurality of optical couplers for coupling some or all (e.g. each) of the M first optical signals with one another, such that at least one (e.g. all) of the N second optical signals comprises a contribution from the some or all of the M first optical signals, e.g. at least one or all of the N second optical signals is a linear combination of all of the M first optical signals. For this purpose, an optical coupler may be traversed by two optical waveguides and the optical coupler may use a rotation value $\theta$ which defines the degree of coupling between two optical waveguides. The optical processing core may comprise sufficient optical couplers to implement the transfer matrix.

Overall, the optical processing core may be adapted or already designed to decrease a correlation between the N second optical signals compared to a correlation between the M first optical signals, e.g. using a transfer matrix H. The correlation may relate to a correlation between at least two optical signals along a timeline. The M first optical signals and the N second optical signals may be representable as M first and N second digital signals, respectively. The transform matrix H, i.e. the optical processing core, may ensure that the correlation between all pairs of the N second digital signals is lower than the correlation between all pairs of the M first digital signals. In this context, the correlation may be determined as a (moving) average of multiplied samples of two digital signals over a predetermined time period.

The optical processing core may comprise one or more optical processing stages. The one or more optical processing stages are traversed by a plurality of single-mode stage waveguides. The plurality of stage waveguides are coupled to at least three of the M first waveguides at a first end of the optical processing stage. In a preferred embodiment, the plurality of stage waveguides is coupled (indirectly) to all of the M first waveguides at the first end of the optical processing stage. This means that an optical processing stage may process one or more optical signals which are derived from all of the M first optical signals.

Furthermore, the plurality of stage waveguides is coupled to at least one of the N second waveguides at a second end of the optical processing stage. This means that an optical processing stage provides an optical signal which contributes to at least one of the N second optical signals.

The optical processing stage may comprise one or more of a phase shifter and an optical coupler. A phase shifter is typically applied to at least one of the plurality of stage waveguides and the phase shifter is adapted to shift a phase of an optical signal on the one of the plurality of stage waveguides by a phase value $\phi$ (also referred to as $\Phi$ in the present document). An optical coupler is typically applied to two of the plurality of stage waveguides. The optical coupler is adapted to mix two input optical signals on the two of the plurality of stage waveguides at a first end of the coupler using a rotation value $\theta$ to provide two coupled optical signals on the two of the plurality of stage waveguides at a second end of the coupler. The function of the optical coupler may be described as follows: If the two input optical signals and the two coupled optical signals are considered to form an x and y axis of a Cartesian coordinate system, the optical coupler is adapted to perform a rotation of the two input optical signals by the rotation value $\theta$ to produce the two coupled optical signals.

In an embodiment, a processing stage comprises one or more optical couplers which process one or more different pair of the stage waveguides (wherein each of the stage waveguides is at the most comprised in one pair). In order to ensure that all of the M first optical signals may contribute to each of the N second optical signals, the optical processing core may comprise a sequence of processing stages in sequence, wherein the plurality of stage waveguides at the second end of a first optical processing stage are coupled to the plurality of stage waveguides at the first end of a second optical processing stage in a permutated manner. As such, different pairs of stage waveguides may be processed by the optical couplers in the second processing stage than in the first processing stage. It may be shown that for N>2, each of the M first optical signals may contribute to each of the N second optical signals if the optical processing core comprises N−1 or less processing stages. However, in general, it can also be realized by more than N−1 stages. Each processing stage may comprise M/2 or less couplers.

The M first optical signals may be associated with corresponding M samples of an optical field distribution at M different spatial positions on an endface of the multi-mode fiber. In other words, the M first optical signals may be obtained by sampling an optical field distribution at the endface of the multi-mode fiber at M different positions. The M different positions are typically selected in dependence of the symmetry of the N spatial modes which are to be sampled. In particular, the M different positions are typically selected to allow for a distinction between the N spatial modes of the multi-mode fiber using the M spatial samples. In other words, the M different positions should be selected such that the field distributions of the N different spatial modes lead to different sets of M spatial samples.

The transfer matrix H of the optical processing core may be designed such that the N second optical signals represent the N modes carried by the multi-mode fiber. In other words, the transfer matrix H may be designed such that the M spatial samples are transformed to the N modes.

By way of example, this may be achieved by selecting the optical processing core such that under the condition that the M samples are associated with an optical field distribution of a single one of the N spatial modes carried by the multi-mode fiber, the optical processing core is adapted to combine the M first optical signals to a single one of the N second optical signals. In view of the reversibility of optical systems, the inverse condition typically also applies, i.e. that under the condition that the M samples are associated with an optical field distribution of a single one of the N spatial modes carried by the multi-mode fiber, the optical processing core is adapted to generate the M first optical signals from a single one of the N second optical signals.

As such, the optical processing core may interlink the M first waveguides with the N second waveguides in such a manner that a sampled field energy of one of the N modes of the multi-mode fiber is concentrated onto exactly one of the N second waveguides.

This condition may be fulfilled for all of the N modes and for all of the N second waveguides. I.e. for each single one of the N spatial modes, the optical processing core may be adapted to combine the M first optical signals to a different single one of the N second optical signals; and/or inversely to generate the M first optical signals from a different single one of the N second optical signals.

Consequently, an optical (spatial) mode multiplexer/demultiplexer may be described. The mode multiplexer/demultiplexer is adapted to couple N second optical signals from N second single-mode waveguides to N spatial modes of a multi-mode fiber and/or vice versa, N>1. For this purpose, the spatial mode multiplexer/demultiplexer may comprise, e.g. in the form of the interface of the optical processing system, a spatial sampler adapted to generate M samples of an optical field distribution at M different spatial positions on an endface of the multi-mode fiber from M first optical signals carried within M first single-mode waveguides, M>2 (multiplexer) and/or vice versa (demultiplexer). Furthermore, the mode multiplexer/demultiplexer comprises an optical processing system as described in the present document. The optical processing system is adapted to generate the M first optical signals from the N second optical signals (multiplexer) and/or vice versa (demultiplexer).

The one or more phase values φ of the one or more phase shifters and/or the one or more rotation values θ of the one or more couplers, referred to as one or more parameters of the optical processing core, may be adjustable. In this case, the optical processing system may be used for adaptive optical signal processing (e.g. for channel equalization). By way of example, the optical processing system may comprise a control unit adapted to determine the one or more parameters of the optical processing core. The one or more parameters may be determined based on the N second optical signals. In particular, the one or more parameters may be determined based on a known or desired characteristic (or property) of the N second optical signals (e.g. a decorrelation between the N second optical signals). By way of example, the N second optical signals may be associated with training sequences transmitted via communication channels provided by the N modes of the multi-mode fiber. In such cases, the control unit may be adapted to determine the one or more parameters based on the training sequences and based on the N second optical signals.

As such, an optical receiver adapted for receiving N optical signals transmitted via N spatial modes of a multi-mode fiber, N>1, may be described. The optical receiver may comprise, e.g. in the form of the interface of the optical processing system, a multi-mode fiber coupler adapted to extract M first optical signals into M single-mode waveguides from the multi-mode fiber, M≥N. An example for such a multi-mode fiber coupler is e.g. a coupled waveguide structure. Furthermore, the optical receiver comprises an optical processing system as described in the present document. The optical processing system is adapted to process the M first optical signals to provide N second optical signals. This processing is performed subject to one or more parameters of one or more phase shifters and/or couplers comprised within the optical processing system. Furthermore, the optical receiver may comprise N optical to electrical converters adapted to convert the N second optical signals into N corresponding received (electrical or digital) signals. The one or more parameters of the optical processing system may be determined based on the N received signals.

It should be noted that the optical processing system may be compatible with polarization multiplexing, i.e. the optical processing system may not only deal with spatial modes but also with polarization modes. For this purpose, the optical processing system may further comprise M/2 polarization beam splitters adapted to generate the M first optical signals from M/2 polarization multiplexed signals and/or vice versa (in such cases M is typically pair).

It should be noted that the methods and systems including its preferred embodiments as outlined in the present document may be used stand-alone or in combination with the other methods and systems disclosed in this document. Furthermore, all aspects of the methods and systems outlined in the present document may be arbitrarily combined. In particular, the features of the claims may be combined with one another in an arbitrary manner.

DESCRIPTION OF THE DRAWINGS

The invention is explained below in an exemplary manner with reference to the accompanying drawings, wherein

FIG. 10 illustrates another example all-pass filter adapted to concentrate the optical power of various spatial samples of a plurality of optical modes to a corresponding plurality of single-mode waveguides and vice versa;

FIGS. 11a and b illustrate example mode splitters/combiners comprising an example optical all-pass filter and different example spatial samplers;

FIG. 12 shows a block diagram of an example spatial mode add-drop multiplexer;

FIG. 13 shows a schematic diagram of an example optical transmission system for multi-mode transmission:

FIG. 14 shows an example optical all-pass filter used for optical channel equalization;

DETAILED DESCRIPTION

As outlined in the introductory section, mode splitters (and inversely mode combiners) are an important component for the realization of MMF transmission based on space division multiplexing (SDM) (or Mode Division Multiplexing).

The mode splitters/combiners are placed at the transmit and receive side of the MMF transmission fiber and multiplex the different pigtails of a multi-mode transmitter to different MMF mode fields (LP modes) of the MMF or demultiplex the different MMF mode fields (LP modes) to different pigtails of a receiver.

Figure 1:
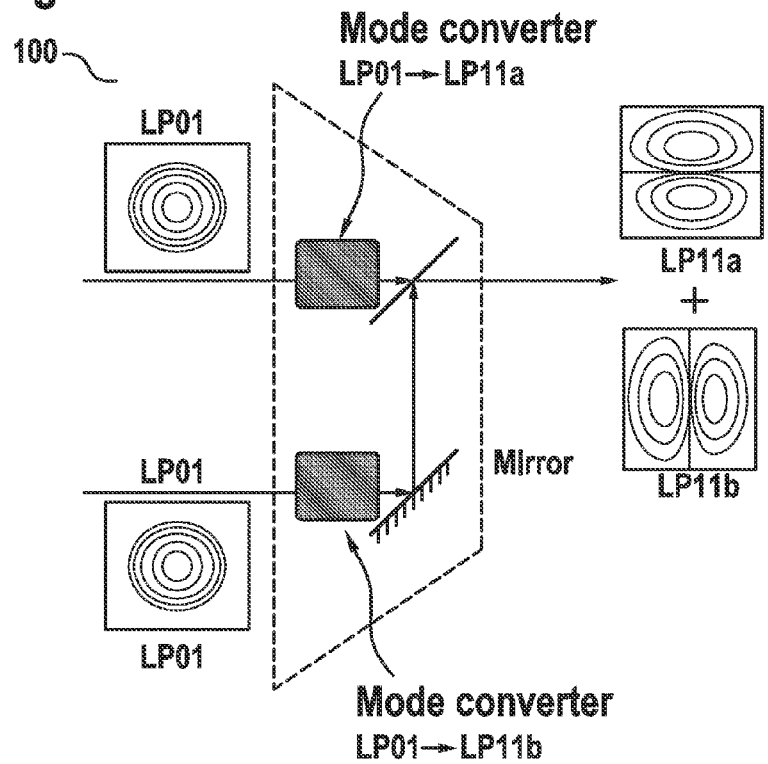
FIG. 1 shows a block diagram for an example mode splitter/combiner arrangement using mode converters.

Mode splitters/combiners used today are typically based on multi-mode power dividers and different mode transformers (phase holograms) at each of the outputs. An example mode splitter/combiner 100 comprising a bulk optic power divider and mode converters is shown in FIG. 1. The mode splitter/combiner 100 multiplexes two SMF modes (LP01) to the MMF modes LP11a and LP11b, respectively. The drawback of such mode splitters/combiners is a relatively high loss (1/N) due to the use of a power divider and the relatively costly bulk optic realization.

Figure 2:
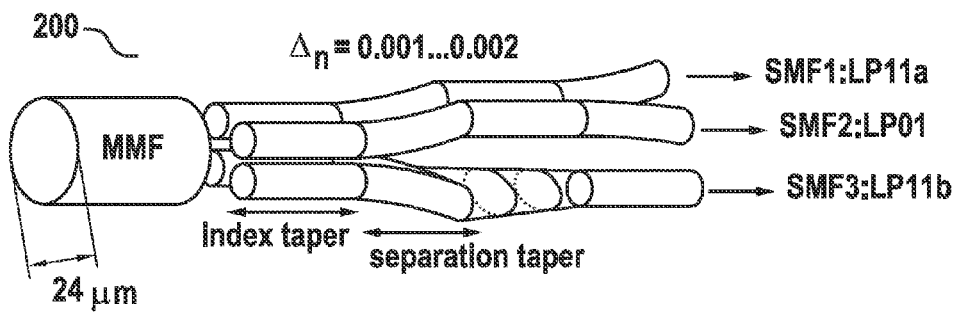
FIG. 2 shows a schematic view of an example mode splitter/combiner arrangement using coupled waveguide structures.

Alternative realizations of a mode splitter/combiner 200 are based on coupled waveguide structures (e.g. photonic crystal fibers) with adiabatically changing refractive index profiles (see FIG. 2). The waveguide structure 200 is formed by four coupled single-mode waveguides which transform the MMF's LP (Linear Polarization) modes to the basic mode of SMF output pigtails. The mode splitter/combiner 200 is in principle lossless, however, the realization of complex waveguide structures might be costly. Furthermore, the scalability of the mode splitter/combiner 200 to higher mode numbers (N) might be challenging.

In the present document a mode splitter/mode combiner architecture is described which makes use of optical signal processing. The described mode splitters/combiners allow for a cost-effective realization using photonic integrated circuits (PIC), e.g. Silicon PIC. Furthermore, the described mode splitters/combiners exhibit relatively low power consumption. In addition, the described mode splitters/combiners are scalable to higher mode numbers N of modes.

A mode splitter (mode combiner) may be implemented by optically space-sampling different areas of the MMF field, i.e. by sampling different areas on the endface of the MMF. The sampling of different areas of the MMF field may be implemented using a plurality of patches $P_1, \ldots, P_M$, with M being the total number of patches. The so called patches collect the optical field within an area and transform it to the field of a single mode waveguide or fiber. Possibilities of realization is a lens or lens-system which concentrates the light of an area into the fundamental mode of a single mode waveguide or a waveguide taper whose fundamental mode of a multi-mode part is adiabatically transformed to the fundamental mode of a fiber (cf. the waveguide tubes in FIG. 3).

Figure 3A:
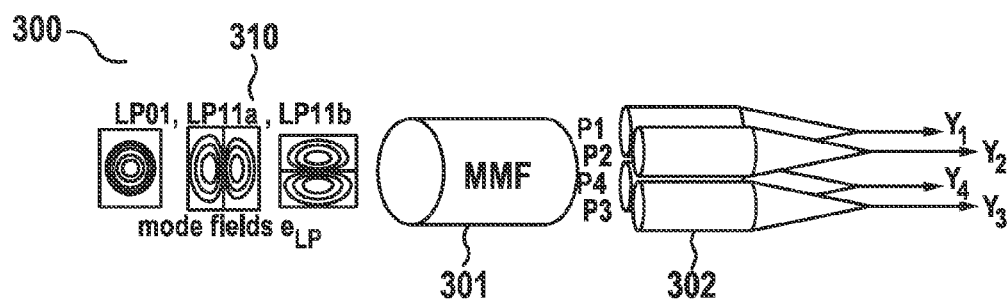
FIGS. 3a and b illustrate example spatial samplers using butt coupling.
Figure 4:
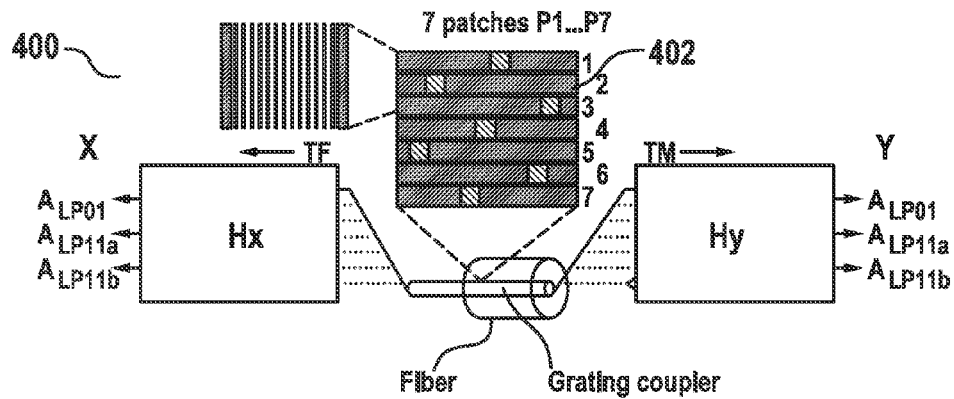
FIG. 4 illustrates an example spatial sampler using a plurality of gratings.

Typically, the number of patches M is selected based on the number N of modes carried within the MMF. In order to allow for an isolation (or coupling) of the N modes, M should be greater or equal to N. FIGS. 3a,b and 4 illustrate example spatial samplers 300, 400. The spatial sampler 300 of FIGS. 3a and b comprises M=4 SMFs 302 which sample the light at the endface of the MMF 301 at four different locations or areas, thereby providing M=4 patches $P_1, \ldots, P_4$. The spatial sampler 400 of FIG. 4 provides M=7 patches using Silicon photonics integrated circuits (PIC) with vertical grating couplers 402. A demonstration of the technology platform of FIG. 4 for a different application can be found in C. R. Doerr and T. F. Taunay, "Silicon Photonics Core-, Wavelength-, and Polarization-Diversity Receiver", IEEE PHOTONICS TECHNOLOGY LETTERS, VOL. 23. NO. 9, May 1, 2011, pp. 597, which is incorporated by reference.

The spatial samplers 300, 400 provide M patches or samples of the MMF field, and it is proposed to apply further optical processing to the M space samples, in order to isolate the N modes. The further processing may be performed in a single-mode waveguide filter structure providing a MIMO filter with a transfer function H.

Figure 3B:
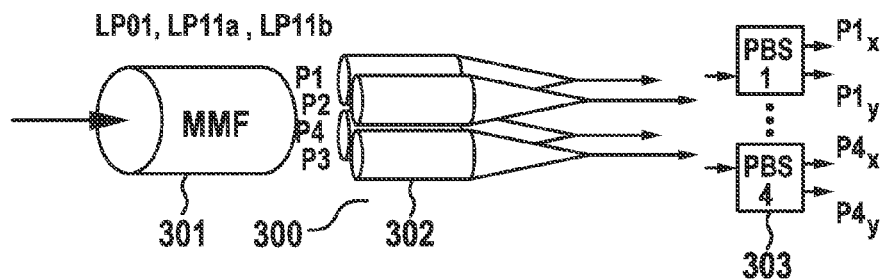

It may be beneficial to perform the further processing in a polarization diversity operation, since the polarization of the optical signal at the receiver is typically unknown in many applications. In this case, the spatial sampler 300 may comprise polarization beam splitters (PBS) 303 as shown in FIG. 3b. The PBSs 303 provide two space samples $P_{mx}$ and $P_{my}$ for each of the m=1, ..., M space samples. Subsequently, a separate MIMO filter (Hx and Hy) may process the X and Y polarized light individually.

As such, the light of different areas of the MMF signal may be captured by the M patches 302, 402 of spatial samplers 300, 400. The spatial samplers 300, 400 may transform the space sampled light into the basic mode of M single-mode waveguides (or fibers). The light of the patches, i.e. the light of the M single-mode waveguides is processed in an optical MIMO filter (providing an N×M transfer matrix H). The signals $A_{LP}$, with i=01, 11a, 11b, etc., of the N LP modes are separated and appear at N single-mode output waveguides at the output of the optical MIMO filter.

Figure 5:
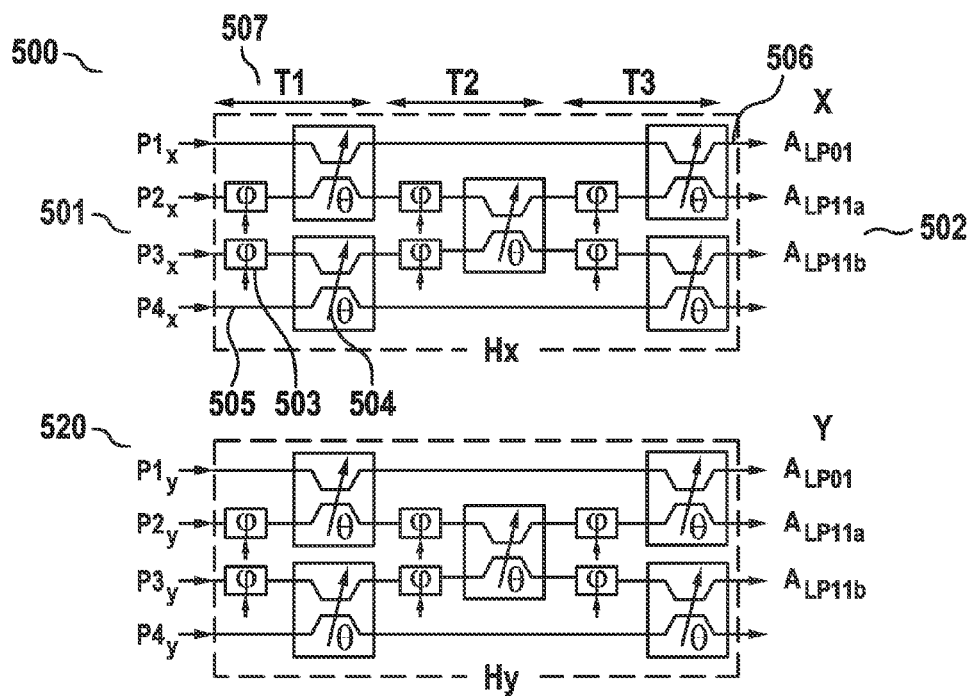
FIG. 5 illustrates example all-pass filters comprising optical signal processing.

Example optical MIMO filters 500, 520 for the X, Y polarized light, respectively, are shown in FIG. 5. M=4 space samples 501 enter the optical MIMO filters 500, 520 from the spatial samplers 300, 400 via a respective M single-mode input waveguides 505. The optical MIMO filters 500, 520 comprise a plurality of optical processing units 503, 504 which are configured to modify the optical signal of one or more of the M single-mode input waveguides 505. Example optical processing units 503, 504 are tunable phase shifters 503 (phase parameter φ) and tunable couplers 504 (rotation parameter θ). At the output of the optical MIMO filters 500, 520 N=3 optical signals $A_{LPi}$, with i=01, 11a, 11b, etc., of the N LP modes carried within the MMF 301 are provided within N single-mode output waveguides 506. By way of example, the patch signals 501 P1x, P2x, P3x, P4x are optically processed such that the N single-mode output waveguides 506 carry the optical signals $A_{LPi}$, with i=01, 11a, 11b, etc., of the N LP modes carried within the MMF 301. A similar processing may be performed for the Y polarized light.

The parameters of the optical processing units 503, 504 may be designed based on theoretical considerations regarding the spatial modes carried by the MMF. This will be outlined in further details below. Alternatively or in addition, the parameters of the optical processing units 503, 504 may be tuned in the context of an initial training phase. During such a training phase, known optical transmission signals may be transmitted over the overall optical transmission paths and the parameters of the optical processing units 503, 504 may be adapted such that an error or distortion criterion at the receiver (downstream of the optical MIMO filters 500, 520) is minimized. Alternatively or in addition, the parameters may be adapted continuously to changes of the overall optical transmission path (e.g. using a constant modulo algorithm, CMA, in conjunction with an appropriate error or distortion criterion).

From a theoretical point of view, in embodiments the use of a spatial sampler 300, 400 in combination with an optical MIMO filter 500, 520 relies on the following aspects: The spatial sampler 300, 400 provide basic (LP01) modes at its output (i.e. the input of the PBSs 303 in FIG. 3b). With increasing patch number M, the N lowest of the M eigenvectors of the coupled patch waveguides converge to the N spatial modes of the MMF. In other words: Each LP mode of the fiber couples dominantly only into its corresponding mode of the coupled patches. Furthermore, the MIMO filter H (Hx and Hy) 500, 520 is a MIMO allpass with M inputs, but with a (equal or reduced) number N of outputs. The filter H (Hx and Hy) 500, 520 is ("internally") configured to transform each mode of the N modes of the MMF of which spatially sampled optical signals are carried in the M patch waveguides 505 to a particular one of the output waveguides 506. However, since only the modes are excited at the patches which have the same mode profile as the LP modes of the MMF, only N outputs are used. In addition, the internal transfer matrix H is a unitary (lossless) rotation matrix formed by a cascade of K processing stages 507 described by K transfer functions $T_i$, i=1 . . . L (L=3 in FIG. 5). Each of the L transfer stages 507 performs a rotation by distributing power or phase. For this purpose, a transfer stages 507 comprises one or more optical processing units 503, 504. As indicated above, the optical processing units 503, 504 may be couplers 504 with a fractional (power) coupling ratio $(\tan(\theta))^2$ or phase shifters 503 applying a phase shift of phase φ. The overall MIMO filter transfer function H is obtained by cascading the transfer functions of the L stages, i.e. $H=T_L T_{L-1} T_{L-2} \ldots T_1$. The number L of cascaded stages 507 should be sufficient to perform the required unitary transformations and can typically be determined numerically. Fine tuning (e.g. using thermo-optic phase shifters) of the processing units might allow adjusting to a limited number of patches and to a maximum extinction between the N output ports 506.

In the following, the spatial mode multiplexer (or inversely spatial mode demultiplexer) described in the present document is analyzed in further detail. The basic functionality of a spatial mode multiplexer (SMMux) is to couple a set of 2N single polarization input signals Ch1x, Ch1y, Ch2x, Ch2y, . . . ChNx, ChNy, the amplitudes of which are summarized in a 2N dimensional complex amplitude vector $\vec{a}=(A_{Ch1x}, A_{Ch1y}, \ldots, A_{ChNx}, A_{ChNy})^T$, into a mode set of 2N modes of a multimode fiber (MMF). Analogously to the amplitude vector of the 2N single-mode and single polarization signals, the amplitudes of the 2N modes of the MMF may be denoted by an amplitude vector $\vec{z}=(Z_{Ch1x}, Z_{Ch1y}, \ldots, Z_{ChNx}, Z_{ChNy})^T$. In the following it is assumed that the mode set of the MMF are the LP (linear polarized) modes of a weakly guiding fiber. In this context x and y in the subscripts of each amplitude $Z_{Ch.}$ indicate that each of the N spatial LP modes ($Z_{Ch..}$) exists in two orthogonal polarizations x and y, respectively. An ideal SMMux couples each input signal into only one dedicated mode without any loss. This means that the transfer function of the ideal SMMux can be described by an identity matrix $I_{2N}$ of size 2N. The amplitude vectors $\vec{a}$ and $\vec{z}$ of the N spatial LP modes (in X and Y polarization) and of the 2N modes of the MMF, respectively, are then linked by $I_{2N}$, i.e. $\vec{z}=I_{2N}\vec{a}$.

In the following, it is assumed that the modes in the MMF are excited by a phase-array type spatial field synthesizer composed by M optical patches $P_1, \ldots, P_M$ across the cross area (or endface) of the MMF. Each patch converts a pair of two input signals $(B_{1x}, B_{1y}), \ldots, (B_{Mx}, B_{My})$ in the two orthogonal states of polarization (SOPs) x and y into a launching field $e_1, \ldots, e_M$ at the output facet of each patch. In the following analysis it is assumed that the field distribution $f_i$ of $e_i$ (i=1, . . . , M) is a Gaussian function of an $LP_{01}$ mode with the core diameter 2r of the patch output. Each patch generates a vector field $e_i=(e_{ix}, e_{iy})$ with components in x and in y polarization $e_i=(B_{ix} f_i, B_{iy} f_i)$ (i=1 . . . M). For convenience the input signals to all patches are summarized in a vector of exciting amplitudes $\vec{b}=(B_{ix}, B_{iy}, \ldots, B_{Mx}, B_{My})^T$. Each patch i=1 . . . M excites mode amplitude $dZ_{j,pol}$ of the mode $LP_{j,pol}$ according to the butt coupling integral $dZ_{ji,pol}=\int(e^*_{i,pol} \cdot e_{LPj,pol})dA$ where $e_{i,pol}$ and $e_{LPj,pol}$ are normalized complex fields of patch and MMF mode, respectively, carrying unity power, (i=1 . . . M, j=1 . . . N, and pol=x,y) and wherein dA indicates the integration across an area of the endface of the multi-mode fiber. The overall field formed by all patches is $e=\Sigma e_i$. The overall field excites the $LP_{j,pol}$ modes with amplitudes $Z_{j,pol}$, with $Z_{j,pol}=\Sigma_{i=1}^M dZ_{ji,pol}$.

The transfer function between the exciting amplitudes $\vec{b}$ of the patches and the mode amplitudes $\vec{z}$ may be summarized by a coupling matrix K of size 2N·2M: $\vec{z}=K\vec{b}$. For the design of an ideal SMMux the task is: Find a solution for a passive processing system with the transfer function H which converts the transmitter signals represented by the 2N dimensional amplitude vector $\vec{a}$ into the patch input signals $\vec{b}$, i.e. $\vec{b}=H\vec{a}$, such that the total transfer matrix between the input amplitudes $\vec{a}$ and the mode amplitudes $\vec{z}$ exhibits low loss and low cross talk to other modes, i.e. such that K·H approximates $I_{2N}$.

With an increasing number of patches M the total patch field can better approximate the LP mode fields $e_{LPN,pol}$ and as a consequence, the coupling loss as well as the cross coupling into other modes can in principle be reduced to zero.

Since each column in the coupling matrix K can be considered to be a vector of samples of an LP mode field over the cross section of the MMF, an increasing number of patches M implies that different column vectors $K^i$ (i=1, ..., 2N) of the coupling matrix K represent different LP modes and, hence, different $K^i$ become more and more orthogonal, i.e. $K^i \cdot (K^j)^*$ converges to 0 for i≠j with increasing M.

In view of the above, the design of an appropriate SMMux will be divided into two tasks. In a first step, it will be motivated that there exists a waveguide structure which allows converting the 2N input signals with amplitudes $A_{Ch1x}$, $A_{Ch1y}$, ..., $A_{ChNx}$, $A_{ChNy}$, i.e. 2N vectors $(A_{Ch1x}, 0, ..., 0, 0)^T$, $(0, A_{Ch1y}, ..., 0, 0)^T$, $(0, 0, ..., A_{ChNx}, 0)^T$, $(0, 0, ... 0, A_{ChNy})^T$, to 2N orthogonal vectors $\vec{b}$ with theoretically no loss using a transfer matrix H. In a second step, the trade-off between patch count M and mode count N is discussed by a closer look at some geometrical arrangements of patches which allow for low crosstalk mode launching with a limited number M of patches.

In the following, the architecture of an example optical multiple-input multiple-output (MIMO) waveguide filter 500, 520 (having a transfer function H) is described which transforms three input signals 502 to three different sets $\vec{b}$ of phased array patch stimuli which excite N=3 (three) different spatial LP modes (LP01, LP11a, LP11b) of a few-mode MMF for each input signal, respectively. However, for convenience, in the following a solution to the inverse problem is addressed, i.e. a MIMO filter design for a demultiplexer which transforms three sets $\vec{b}$ of M=4 spatial samples of the three LP modes to three different output waveguides 506. Due to the reciprocity of passive optical systems, the demultiplexer problem corresponds to the multiplexer problem. Reference is made to the spatial sampler 300 of FIG. 3a. At the left hand side in FIG. 3a the three mode field distributions 310 $e_{LP01}$, $e_{LP11a}$, and $e_{LP11b}$ are shown. The right and left areas of the LP11a field and the upper and lower areas of the LP11b field correspond to positive and negative field amplitudes, respectively. A coarse spatial sampling is performed by M=4 patches P1 ... P4 formed by four collimators 302. The four collimators 302 transform their LP01 modes—excited by the MMF's LP modes—to four single-mode waveguides. Each patch $P_i$ provides a pair of complex amplitudes $B_{i,x}$ and $B_{i,y}$ for x and y polarization, respectively. For simplicity, the y polarization will be omitted and it will be assumed that the state of polarization (SOP) for all modes is linear X polarization. Hence the spatial samples can be written as column vectors $\vec{b} = (B_1, ..., B_M)^T$ with M=4 complex elements.

Figure 6:
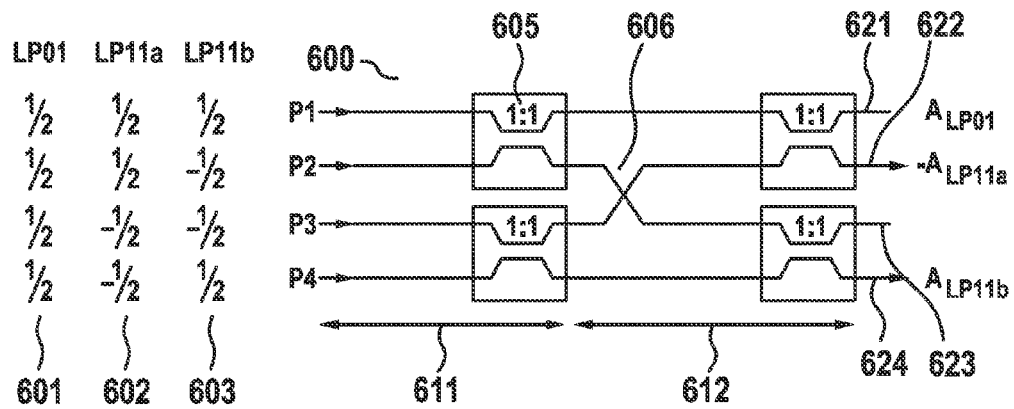
FIG. 6 illustrates another example all-pass filter which makes use of optical signal processing.

The design of the example demultiplexing filter 600 shown in FIG. 6 is guided by the idea, that spatial samples $\vec{b} = (B_1, ..., B_M)^T$ of different orthogonal LP modes are orthogonal again, at least if the granularity of the spatial sampling across the mode field area is sufficiently fine, i.e. if M is sufficiently large. In other words, a first spatial vector $\vec{b}_1$ of the $LP_{01}$ mode should be orthogonal to a second spatial vector $\vec{b}_2$ of the $LP_{11a}$ mode, and should be orthogonal to a third spatial vector $\vec{b}_3$ of the $LP_{11b}$ mode. This is illustrated in FIG. 6 by the three spatial vectors $\vec{b}_n$, n=1, ..., N=3, (reference numerals 601, 602, 603, respectively) for the three modes $LP_{01}$, $LP_{11a}$ and $LP_{11b}$. For an ideal demultiplexer it is targeted to provide only one output port 506 for each LP mode, which corresponds to three output signals $A_i$. This means that the output vectors $\vec{a}_n$, n=1, ..., 3, for the three modes $LP_{01}$, $LP_{11a}$ and $LP_{11b}$ written as complex vectors $\vec{a} = (A_1, ..., A_M)^T$, are orthogonal basis vectors, e.g., $\vec{a}_1 = (1\ 0\ 0\ 0)^T$, $\vec{a}_2 = (0\ 1\ 0\ 0)^T$, and $\vec{a}_3 = (0\ 0\ 1\ 0)^T$, if the amplitudes of the three modes are assumed to be unit amplitudes. Hence, the transfer function $G=H^{-1}$ of the MIMO filter 600 linking the spatial vectors $\vec{b}_n$, n=1, ..., 3, with the output vectors, $\vec{a}_n$, n=1, ..., 3, i.e. $\vec{a}_n = G \vec{b}_n$, n=1, ..., 3, is a unitary matrix applying a complex rotation of the spatial input vectors $\vec{b}_n$ while maintaining the orthogonality of the spatial vectors. This means that the MIMO filter $G=H^{-1}$ can be implemented as a sequence of complex rotations provided by the optical processing units 503, 504.

Figure 7A:
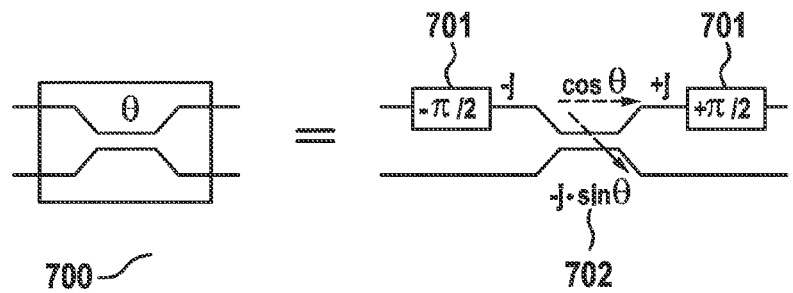
FIGS. 7a and b show example optical signal processing units.

In the following, a MIMO filter waveguide structure 600 with a unitary transfer characteristic will be derived by using a real valued 2×2 coupler 700 with a coupling ratio defined by the angle θ, as shown in FIG. 7a,b. FIG. 7a depicts the real valued coupler 700. The real valued coupler 700 has a real valued rotation matrix R(θ) as a transfer function and can be composed of an optical phase shifters 701 of +π/2 and a directional coupler 702 with a power coupling ratio of $(\sin θ)^2/(\cos θ)^2 = (\tan θ)^2$. The waveguide coupler 702 is described by a complex transfer function $$\begin{pmatrix} \cos(θ) & -j\sin(θ) \\ -j\sin(θ) & \cos(θ) \end{pmatrix},$$

and for the concatenation of phase shifters 701 and coupler 702, the real valued 2D rotation matrix is obtained as:

$$R(θ) = \begin{pmatrix} j & 0 \\ 0 & 1 \end{pmatrix}$$
$$= \begin{pmatrix} \cos(θ) & -j\sin(θ) \\ -j\sin(θ) & \cos(θ) \end{pmatrix} \begin{pmatrix} j & 0 \\ 0 & 1 \end{pmatrix}$$
$$= \begin{pmatrix} \cos(θ) & \sin(θ) \\ -\sin(θ) & \cos(θ) \end{pmatrix}.$$

Figure 7B:
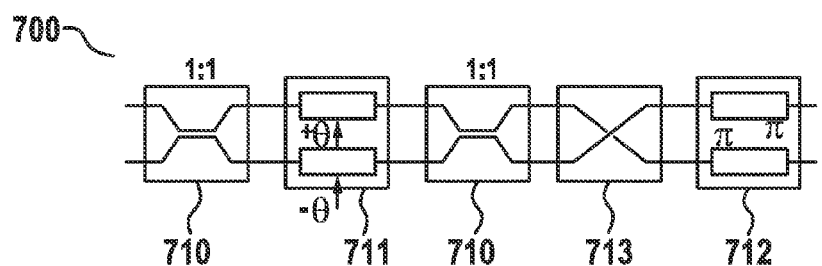

In the above equation θ=π/4 leads to a real valued 1:1-coupler (3-dB coupler). FIG. 7b depicts an alternative waveguide structure of the real valued coupler 700. The waveguide structure 700 of FIG. 7b is a solution which might be more appropriate for practical realization. The real valued coupler 700 with tunable coupling ratio 702 (see FIG. 7a) is replaced by a cascade of two fixed 1:1 couplers 710, two tunable phase shifters 711 in push-pull operation applying angles of +θ and −θ, and fixed phase shifters 712 and a waveguide crossing 713.

Each coupler processes two adjacent input signals. In case of four inputs, two couplers can operate in parallel, as illustrated by the stack of two couplers 605 used in FIG. 6. The stack of two couplers 605 leads to a transfer matrix of size 4×4 which depends on two phase values θ1 and θ2:

$$C(θ1, θ2) = \begin{pmatrix} R(θ1) & 0_2 \\ 0_2 & R(θ2) \end{pmatrix},$$

with $0_2$ denoting a 2×2 submatrix of zeros. Moreover, permutation matrix S(i–j) describes a crossings 606 of a pair of waveguides i and j. In the middle part of the structure in FIG. 6 waveguides 2 and 3 are crossed, leading to a permutation matrix S(i–j)

$$S(2-3) = \begin{pmatrix} 1 & 0 & 0 & 0 \\ 0 & 0 & 1 & 0 \\ 0 & 1 & 0 & 0 \\ 0 & 0 & 0 & 1 \end{pmatrix}.$$

A further processing element or processing unit which may be used are phase shifters 503 which apply a phase shift of $\phi_i$ (i=1 ... 4) at some or all of the M=4 waveguides. The corresponding transfer function of a phase shifter applying phase shifts of $\phi_i$ (i=1 ... M) to the M waveguides is $$F(\varphi_1, \ldots, \varphi_M) = \begin{pmatrix} \exp(j\varphi_1) & 0 & 0 \\ 0 & \ldots & 0 \\ 0 & 0 & \exp(j\varphi_M) \end{pmatrix}.$$

In general, a MIMO filter 600 leading to a unitary M×M matrix G, which may be referred to as a M×M MIMO all-pass filter, is formed by a concatenation of waveguide crossings (S(m,n)), phase shifters (F($\phi_i$)), and couplers (C($\theta$i)). The concatenation of these three basic processing elements may be defined as a processing segment with an overall transfer function T=C·F·S. A concatenation of up to M−1 of such processing segments are typically required to ensure that the outermost waveguides (1 and M) may interfere. Hence G becomes the product of left-multiplications of M−1 (or less, as demonstrated by following examples with M=4 and M=9) processing segments $$G = \prod_{i=1 \ldots M-1} T_i$$

$$= \prod_{i=1 \ldots M-1} C_i F_i S_i$$

In order to determine the waveguide parameters given by angles $\phi$, $\theta$, and the permutation pairs (i-j), one may start with the N detection vectors $\vec{b}_n$, n=1, ..., N, (N=3) of the LP modes (as illustrated by the three columns 601, 602, 603 of FIG. 6). The target of the all-pass filter design is to apply consecutive rotations either in the complex plane or between a pair of waveguides, such that after each rotation step the input signals become real valued or appear only in one output waveguide of a coupler, respectively. Finally, after passing through all segments, the signal of each LP mode should appear at a different output waveguide.

This systematic procedure will be illustrated for the example of N=3 LP modes, as shown in FIG. 6.

At the input to the first processing segment $T_1$ (reference numeral 611) each mode excites a wave in each patch, i.e. none of the three vectors $\vec{b}_n$ has zero elements. Hence, no waveguide crossing is needed. I.e. $S_1 = I_N$, the 4×4 identity matrix.

All elements of the vectors $\vec{b}_n$ are real; hence, no phase shifter has to apply a rotation in the complex plane to a real value, i.e. $F_1 = I_N$.

The upper coupler of the left two couplers should collect the LP01 signal in its upper output port, the lower coupler should collect the LP11b signal at its lower output port. The ratio of the two input amplitudes of the two respective LP mode signals is 1 and −1, leading to rotation angles of $\theta_1 = \theta_2 = \pi/4$, i.e. the couplers become 1:1 couplers (real valued 3-dB coupler).

In the processing segment $T_2$ (reference numeral 612) it is desired to allow signals of the upper and lower halfs of the sample vectors $\vec{b}_n$ to interfere. Hence, a permutation $S_2 = S(2-3)$ is applied which transports the LP11b signal from the upper two samples (at the lower output port of the upper left hand coupler) to the lower part and which transports the LP11a signal from the lower half (at the upper output port of the lower left hand coupler) to the upper half.

The output signals of $T_1$ for all three input stimuli are real valued, hence, now phase rotation is required and $F_2$ is identity $I_4$.

The two couplers of the processing segment $T_2$ operate in parallel, as is shown on the right hand part of the MIMO all-pass filter of FIG. 6. The mode LP01 appears with the same amplitude and no phase difference at the upper right hand coupler's input ports. $\theta_1 = \pi/4$ leads to a constructive interference of these input signals at the upper output port 621 and 0 interference at the lower output port 622 of this coupler. With this angle the signal of the LP11a mode is completely transferred to the upper coupler's lower output port 622, since the corresponding input amplitudes exhibit a phase difference of $\pi$.

The task for the lower right hand coupler is to transfer the two equal amplitude signals of the LP11b mode exhibiting a phase difference of $\pi$. Again, this $\theta_2 = \pi/4$ is accomplished by a 1:1 coupler which collects the light at the lower output port 624. No light is provided at the upper output port 623.

Figure 8:
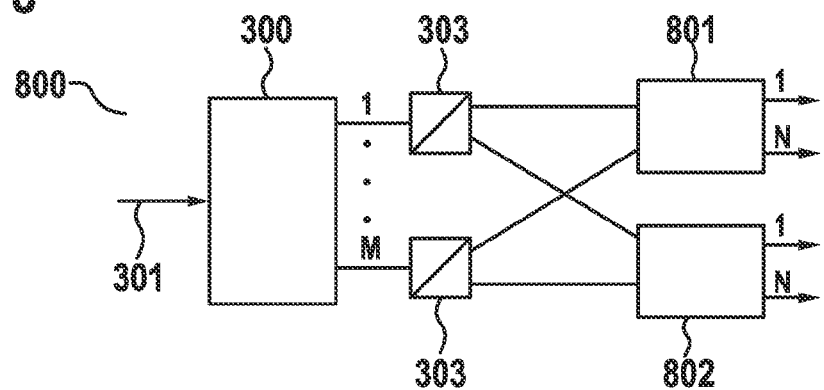
FIG. 8 shows the block diagram of an example mode splitter/combiner for polarization multiplexed optical signals.

The MIMO all-pass waveguide structure of FIG. 6 is tailored to a transformation from M=4 patches to L=3 LP modes (and vice versa) for single polarization processing. In FIG. 8 a SMMux 800 is illustrated for the case that both polarizations x and y of the LP modes are exploited as transmission channels. This means, the single polarization transmitter signals Ch1x ... Ch3x shall excite the modes with x polarization, LP01x, LP11ax, and LP11bx, respectively, and the transmitter signals Ch1y ... Ch3y shall be mapped to modes with y polarization LP01y, LP11ay, and LP11by by the same set of patches. Two (identical) optical MIMO all-pass filters 801, 802 generate two independent excitation signals for x and y polarization. These two all-pass output signal vectors $\vec{b}_x$ and $\vec{b}_y$ are superimposed in M=4 polarization multiplexers (polarization combiners) 303 with orthogonal states of polarization and then launched into the M=4 patches P1 ... P4 of the spatial sampler 300.

Figure 9:
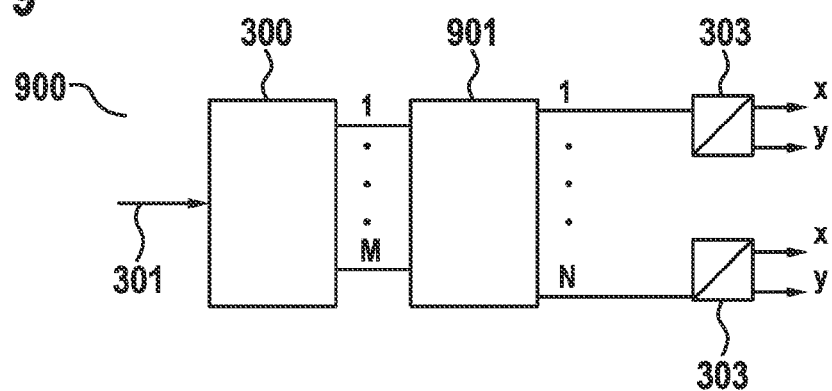
FIG. 9 shows the block diagram of another example mode splitter/combiner for polarization multiplexed optical signals.

An alternative for processing 900 the two polarizations x and y is illustrated by FIG. 9 where the MIMO all-pass filter 901 performs the same signal processing, i.e. exhibits the same transfer functions H for x and y polarization. This allows to first polarization multiplex the single polarization transmitter signals by polarization multiplexers PolM1 ... PolM4 303 and to subsequently apply the all-pass filter 901.

In the following, a further example of an optical MIMO all pass filter for five LP modes is described. In the case of 5 LP modes, the five lowest order spatial LP modes are the three aforementioned modes LP01, LP11a, and LP11b plus LP12a and LP12b. The corresponding mode fields $e_{LPpq}$ are shown in the top part of FIG. 10. The spatial samples provided by the M=4 patches of the spatial sampler 300 of FIG. 3a do not contain sufficient information to demultiplex the LP12a and LP12b modes without loss. Therefore the number of patches is increased from M=4 to M=9 in a geometrical arrangement 1030 as shown in the left part of FIG. 10. A smaller number than M=9 patches should allow to demultiplex the N=5 modes. However, the 8 patches (P2 . . . P9) at the outer circle exhibit the same azimuthal symmetry as the LP modes. This simplifies the MIMO all-pass filter structure. As such, it may be beneficial that the geometry of the spatial sampler (i.e. of the patches of the spatial sampler) is aligned with the geometry of the spatial field of the modes which are to be sampled.

Five spatial sample column vectors $\vec{b}_n$, n=1, . . . , N=5, are shown in the middle part of FIG. 10 (reference numerals 1021, 1022, 1023, 1024, 1025). These five M-element vectors are orthogonal and are assumed to be spatial samples provided by the patches. The spatial vectors $\vec{b}_n$, n=1, . . . , N=5, reflect the amplitude of the fields generated at the patches P1, . . . P9 by a corresponding one of the N=5 LP modes. In other words, a spatial vector $\vec{b}_n$ describes the amplitude at the patch positions P1, . . . , P9 generated by the corresponding mode n. As indicated above, typically there is a dependency between the patch structure, the mode field structure, the orthogonality of the sampling vectors $\vec{b}_n$, and the performance of the spatial mode multiplexer (SPMux) or the spatial mode demultiplexer (SPDeMux).

In the right-hand part of FIG. 10 the waveguide structure of the corresponding MIMO all-pass filter is shown. This MIMO filter 1040 comprises four (N−1) processing segments 1011, 1012, 1013, 1014 which rotate the N=5 orthogonal sample vectors $\vec{b}_n$ to N=5 of the 9 existing orthogonal basis vectors $[1, 0, . . . , 0]^T$ to $[0, . . . , 0, 1]^T$. Following the guidelines elaborated in the context of FIG. 6, no back plane rotation in the complex domain by a phase matrix F is required due to real values of all LP mode samples B1 . . . B9 (i.e. F=I$_9$) and due to real valued couplers applying real plane rotations. Moreover, the azimuthal symmetry of the samples of the circle patches B2 . . . B9 leads to the same magnitude of many pairs of samples (Bi,Bj). Again, as it was already the case for the 3 LP mode example of FIG. 6, the same magnitude of samples leads to back rotation angles θ of a tan(Bi/Bj)=a tan(1)=π/4 which are executed by 1:1 couplers. Hence, all segments 1011, 1012, 1013, 1014 of the MIMO all-pass filter 1040 in FIG. 10 which process only samples of the circle patches P2 . . . P9 comprise 1:1 couplers. Only the right-most top coupler has to apply constructive interference of the LP01 mode power collected by patches P2 to P9, appearing at its lower input port, and the power collected by the center patch P1 at its upper input port. The corresponding amplitude ratio 0.1/0.552 necessitates a rotation angle of θ=0.986 rad. This rotation is provided by the top coupler in FIG. 10 with a power splitting ratio of 0.31:0.70.

In the following, aspects regarding the mode field samples which are used for the MIMO all-pass filter design and the patch optimization are described. In the above examples, it has been assumed for the design of a lossless optical MIMO all-pass filter that the samples $\vec{b}_n$ of the N spatial modes are orthogonal. As indicated above, with a high number of patches M>>N, i.e. with a fine granularity of the spatial samples B$_1$ . . . B$_M$, the vector product $\vec{b}_i \cdot \vec{b}_j$ converges to the overlap integral of two mode fields which becomes 0 for different modes (i≠j). On the other hand, this is typically not the case for a limited number M of patches.

Therefore, for the MIMO filter design, mode samples B$_1$ . . . B$_M$ may be used which are the eigenvectors of modes, often referred to as supermodes, of a coupled waveguide structure comprising M identical single-mode waveguides running in parallel and with a geometrical orientation corresponding to the arrangement of the patches. Hence, the sample vectors $\vec{b}_1$ to $\vec{b}_3$ in the arrangement of FIG. 6 may be three of the four eigenvectors of the coupled mode equation $$\frac{d\vec{b}}{dz} = \begin{pmatrix} 0 & c & k & c \\ c & 0 & c & k \\ k & c & 0 & c \\ c & k & c & 0 \end{pmatrix}$$

with the highest eigenvalues (phase constants of the supermodes). c and k are imaginary coupling coefficients between two closest adjacent waveguides and diagonal waveguide, respectively. Due to the weaker coupling to the diagonal waveguide, the magnitude of k is smaller than the magnitude of c. Further details regarding a 4×4 coupled waveguide structure are described in David B. Mortimore, "Theory and fabrication of 4×4 single-mode fused optical fiber couplers", Applied Optics, Vol. 9, No. 3, 20.01.1990, pp. 371-374, which is incorporated by reference.

Following this procedure accordingly for the case of M=9 patches, $\vec{b}_1$ to $\vec{b}_9$ are the eigenvectors of a coupled mode equation of M=9 identical waveguides with strong coupling between circle patch waveguides P2 to P9 (see FIG. 10) to its two adjacent neighbors and weaker coupling to the center waveguide at P1 position.

For the case of M=9 patches and for N=5 modes, independent variation of the diameter of the center patch and the diameter of the circle patches show that coupling losses between the transmitter signals and the MMF modes can be minimized by appropriately selecting the diameter of the center patch and the diameter of the circle patches. Moreover, as a result of the symmetry of the patch structure, crosstalk between different modes, i.e. the residual excitation of non-addressed LP modes, remains zero for a large variation of patch diameters.

FIGS. 11a and b illustrate the combination of a MIMO all-pass filter with different types of spatial samplers. In FIG. 11a, a MIMO all-pass filter 1101 is shown in combination with a spatial sampler 1102 which makes use of vertical gratings for coupling light coming from the filter 1101 into the MMF 301 or for sampling light coming from the MMF 301 and passing the sampled light to the filter 1101. FIG. 11b illustrates the filter 1101 in combination with the spatial sampler 302 of FIG. 3a.

It should be noted that the optical MIMO all-pass filter may also be combined with an arrangement of fused fibers or fused waveguides (as shown e.g. in FIG. 2 and FIG. 16) in order to couple light into the MMF or to extract light from the MMF. If the coupling matrix K is known, the transfer matrix H of the optical MIMO all-pass filter can be determined such that K·H approximates I$_{2N}$. By way of example, the coupling matrix K of a fused fiber coupler may be derived as described in H. Bülow et al. "Coherent Multimode-Fiber MIMO Transmission with Spatial Constellation Modulation", Proceedings of the ECOC, European Conference and Exhibition on Optical Communication (2011), which is incorporated by reference.

As such, a MIMO all-pass filter may be provided which concentrates the optical power of a plurality of spatial samples of one or more optical modes of a MMF into corresponding one or more single-mode waveguides (one single-mode waveguide per optical mode) and vice versa. The optical MIMO all-pass filter can be used in conjunction with a spatial sampler to form a mode splitter/combiner. The mode splitter/combiner (and in particular the MIMO all-pass filter)

is suitable for PIC integration. Furthermore, the described mode splitter/combiner is easily scalable to a higher number N of optical modes, as has been illustrated by FIGS. 6 and 10. In addition, the described mode splitter/combiner does not exhibit power splitting losses, and the overall processing loss can be minimized with an increasing patch count, i.e. with an increasing resolution of the spatial sampler. In view of the optical signal processing performed by the MIMO all-pass filter, the mode splitter/combiner exhibits low power consumption compared to a solution based on mode demultiplexing using electronic DSP MIMO processing.

The mode splitter/combiner described above can be used to build a spatial mode add-drop multiplexer. An example spatial mode add-drop multiplexer 1200 is illustrated in FIG. 12. Mode splitters/combiners 1201, 1202 are used at the input/output of the add-drop multiplexer (ADM) 1200 such that the different spatial modes are provided on single-mode waveguides within the ADM 1200. As such, the individual modes can be manipulated (e.g. dropped or added using optical switches 1202) on the corresponding single-mode waveguides.

In the context of the mode splitters/combiners described above, the optical MIMO all-pass filters mainly comprised fixed or preset optical processing components, in order to concentrate the power of the spatial samples to specific single-mode waveguides or vice versa. In the following, example optical MIMO filters using variable optical processing parameters are described. Such adaptive optical MIMO filters may be used to perform mode demultiplexing and/or channel equalization of an optical multi-mode transmission system in the optical domain.

As already outlined in the introductory section, the capacity (bit/s) transported over an optical fiber (within a given spectrum) can be increased by using multimode fibers (MMF) and by transporting different data channels over the different spatial modes (and the polarization modes) of the MMF. Similar to MIMO transmission in wireless or wireline systems, the original data channels can be separated from the mix of all signals detected by N coherent receivers (e.g. single-carrier or optical OFDM) by a joint digital signal processing (DSP) of all receiver signals (see e.g. A. Tarighat et al., "Fundamentals and Challenges of Optical Multiple-Input Multiple-Output Multimode Fiber Links", IEEE Commun. Mag., May 2007, pp. 1-8 which is incorporated by reference). The system setup shown in the above mentioned reference exhibits the drawback, that the transmission quality, i.e. the bitrate which can be transported over all channels given a specific OSNR, might change statistically due to phase drifts of the different spatial MMF modes joint with coupling between the modes due to bending of the fiber. At the receiver side, stable demultiplexing of the transmitted channels is typically only possible, if mode coupling along the fiber and the input/output couplers are undone by electronic MIMO processing.

FIG. 13 illustrates an example coherent optical transmission system 1300 transmitting a plurality of data channels of the same wavelength over the MMF 302. MIMO signal processing 1301 in the receiver enables the separation of the different data signals which are launched into the fiber. These optical MMF transmission systems 1300 are typically based on simultaneous processing of signal samples of all channels in a digital signal processing (DSP) unit, which is referred to as the MIMO signal processing unit 1301 in FIG. 13. Commonly higher-dimensional butterfly FIR filters are realized in the DSP unit. This results in complex power consuming processing of each digitized signal sample in the DSP. For moderate complex systems (e.g. few mode fibers, FMF) a reduction of the processing effort can be achieved by the use of mode splitters as input and output coupler (e.g. mode splitters/combiners are described in FIGS. 1 and 2). The mode splitters connect each transmitter or receiver pigtail with one mode of the MMF 301. As indicated above, the mode splitter of FIG. 1 is based on multi-mode power dividers and different mode transformers (e.g. phase holograms) at each of the outputs, and exhibits relatively high losses. On the other hand, fused fiber single-mode to multi-mode couplers shown in FIG. 2 and FIG. 16 exhibit low loss, but strong mode coupling which may require DSP processing (as indicated e.g. in the above mentioned reference H. Bülow et al., "Coherent Multimode-Fiber MIMO Transmission with Spatial Constellation Modulation", Proceedings of the ECOC, European Conference and Exhibition on Optical Communication (2011).

Rather than applying digital processing of all coherent receiver samples in the MIMO processing DSP (as illustrated in FIG. 13), it is proposed to process the optical signal at mode-splitter or mode coupler output—prior to detection by coherent receivers 1404—in an integrated optic waveguide structure which forms a MIMO all-pass filter 1403. This is illustrated by the arrangement 1400 in FIG. 14. At the output of a spatial mode splitter 1401 and a polarization mode splitter 1402 at MMF 301 output, a cascade of tunable phase shifters 503 and tunable couplers 504 form an optical MIMO all-pass filter 1403. A tunable coupler 504 may comprise tunable phase shifters and 1:1 couplers (as illustrated in FIGS. 7a and b). The MIMO all-pass filter 1403 is designed such that the total optical input power and the total output power are equal. Furthermore, the transfer matrix H of the MIMO all-pass filter 1403 is typically unitary.

As already outlined in the context of the pre-set MIMO all-pass filters illustrated in FIGS. 6 and 10, the tuning of the phase shifters, i.e. the tuning of the parameters $\phi$ and $\theta$, of the integrated optic structure, may be used to direct different combinations of the light coming from the mode splitter 1401 to the different receivers 1404. In particular, each transmitter signal may be transported to another receiver 1404. The X and Y transmitter polarizations may be demultiplexed to respective output ports. At the output of the optical all-pass filter 1403 the receiver bank 1404 (Rx) may detect the mode demultiplexed and polarization demultiplexed signal.

The number of all-pass filter parameters ($\phi$ and $\theta$) is typically minimum, since the transfer matrix of the all-pass filter 1403 is unitary. Hence less parameters have to be adapted compared to an electronic (or optical) MIMO butterfly FIR.

The parameters may be adapted by a control unit (not shown) to the actual transmission path condition. In a first step, the presetting of the filter parameters may be achieved by a training sequence. Further adaptation or tracking to changing channel conditions may be performed by minimizing the correlation between the channels. By way of example, an error criterion may be defined, wherein the error criterion is indicative of the correlation between the channels at the receivers 1404. Using e.g. a gradient decent method, the filter parameters may be adjusted in order to reduce the error criterion. i.e. in order to reduce the correlation between the channels at the receivers 1404.

In other words, the control unit may start with the measured channel transfer matrix (e.g. subject to a training sequence) and may adjust the all-pass transfer matrix by numerically calculating an all-pass transfer matrix which is (as close as possible to) the inverse of the channel transfer matrix. Fine tuning and tracking may optionally be performed by minimizing a correlation calculated using existing signal samples.

The update rate for the transfer matrix may be (significantly, e.g. by an order of magnitude) lower than the symbol rate of the signal.

Figure 15:
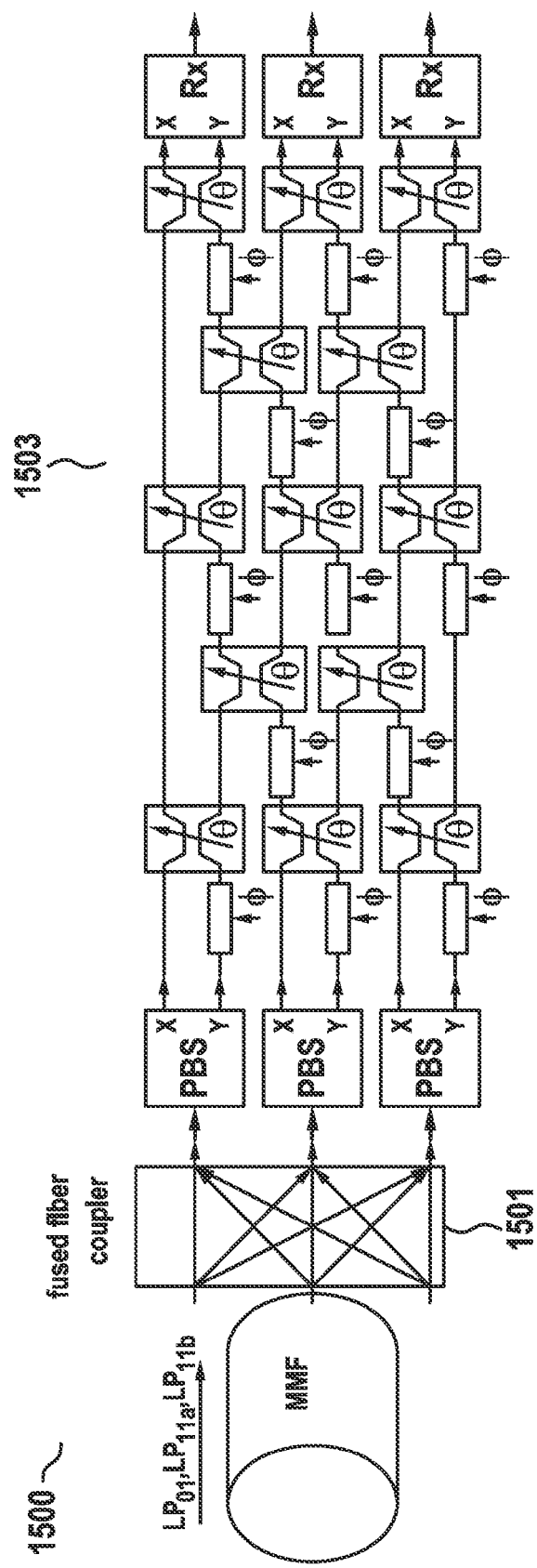
FIG. 15 shows another example optical all-pass filter used for optical channel equalization.

In the example all-pass filter 1403 of FIG. 14, the optical processing which involves more than one spatial mode is limited to spatial modes which typically suffer from cross coupling along the MMF 301 (e.g. the LP11a and the LP11b mode which are degenerated modes with the same phase constant). FIG. 15 shows an optical MIMO all-pass filter 1503 which allows for the optical processing between all possible combinations of spatial modes. In other words, the optical MIMO all-pass filter 1503 is a generic example of an optical MIMO all-pass filter which allows for the interaction between all of the N=3 spatial modes. In the example arrangement of FIG. 15, a fused fiber coupler 1501 is used to direct light from the MMF 301 to the MIMO all-pass filter 1503 (or vice versa). The fused fiber mode splitter 1501 is lossless, but typically introduces coupling between non-degenerated modes. Therefore, the optical processing in the filter 1503 is extended to all modes of the fiber. The MIMO all-pass filter 1503 can then be used to demultiplex the N=3 spatial modes and at the same time to reduce the correlation between the channels, thereby approximating the inverse of the channel transfer matrix of the optical transmission system. This means that an adaptable MIMO all-pass filter 1503 can be used for mode splitting/combining as outlined in the context of FIGS. 6 and 10, as well as for channel equalization.

Figure 16:
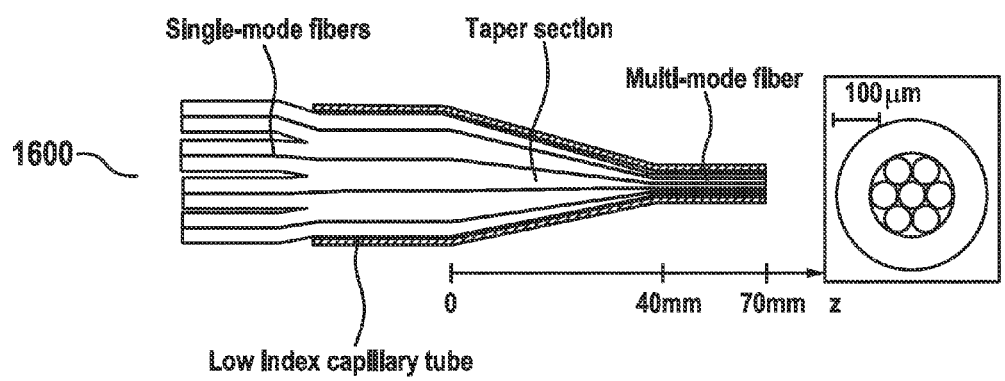
FIG. 16 illustrates an example fused fiber coupler.

FIG. 16 illustrates an example fused fiber coupler 1600 for 7 modes (side view and front view). Such an example fused fiber coupler 1600 is described in Noordegraaf et al., Optics Express, Vol. 17, Issue 3, pp. 1988-1994, 2009, which is incorporated by reference, and in the above mentioned reference H. Bülow et al., "Coherent Multimode-Fiber MIMO Transmission with Spatial Constellation Modulation", Proceedings of the ECOC, European Conference and Exhibition on Optical Communication (2011).

It should be noted that optical delay stages (about half a symbol period or shorter) may be required in case a differential modal delay, PMD (Polarization Mode dispersion, or GVD (Group Velocity Dispersion) becomes non-negligible or cannot be independently compensated in coherent receivers. Alternatively, for stronger distortions, optical slice filters can decompose the signal into more than one spectral slice. These slices of the signal can then be processed independently by optical MIMO all-pass filters, and afterwards a second slice filter operating in opposite direction allows to reconstruct an equalized signal from the independently processed slices.

Figure 17:
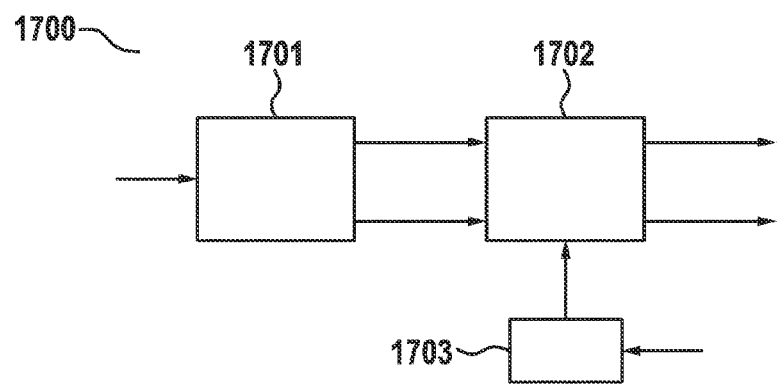
FIG. 17 shows a block diagram of an example optical receiver comprising an adaptive optical all-pass filter for channel equalization.

FIG. 17 shows an example block diagram of an optical receiver 1700 comprising an adaptive optical all-pass filter 1702 for polarization demultiplexing and/or channel equalization. The MMF is linked to a spatial mode demultiplexer/multiplexer 1701. Such a spatial mode demux/mux 1701 may be implemented as a fused fiber (see e.g. FIG. 16), as a mode splitter/combiner as shown e.g. in FIGS. 1 and 2 or as a mode splitter/combiner comprising a (fixed) optical all-pass filter as shown e.g. in FIGS. 11*a* and *b*. The spatial mode demux/mux 1701 provides a plurality of single-mode optical signals on a corresponding plurality of single-mode waveguides. In case of N channels corresponding to N spatial modes of an MMF, the spatial mode demux/mux 1701 should provide N optical signals on corresponding N single-mode waveguides.

The N optical signals are processed within the adaptive optical filter 1702, in order to demultiplex the originally transmitted N input signals from the N optical signals. For this purpose, the adaptive optical filter 1702 should model the inverse of the transfer function of the optical multi-mode transmission system. This means that the parameters of the optical filter 1702 (i.e. the angles φ and θ of the phase shifters and the couplers) should be set accordingly. This may be done by a control unit 1703 which determines the appropriate parameters of the optical filter 1702 based on the N received signals. In particular, the N output waveguides of the filter 1702 may be linked to N corresponding optical receivers, thereby providing N received signals (in the electrical and possibly digital domain). These received signals may be processed, in order to determine the appropriate parameters of the optical filter 1702. By way of example, the N received signals may correspond to the signals received in response to known training sequences, thereby allowing the control unit 1703 to determine the parameters of the optical filter 1702 which reduce the correlation between the N optical signals. Alternatively or in addition, the parameters may be continuously adapted subject to the continuous tracking of an error criterion determined from the N received signals (in the electrical and/or digital domain). This means, while the N optical signals are processed in the optical domain (i.e. while the demultiplexing and or channel equalization is performed in the optical domain), the appropriate parameters for doing the processing are determined from the received signals (in the electrical/digital domain).

In the present document, an optical MIMO filter has been described which can be used for optical processing in order to enable MDM over MMF. In particular, the optical MIMO filter can be used to implement efficient spatial mode splitters/combiners. Furthermore, the optical MIMO filter can be used to perform channel equalization directly in the optical domain. As a result, MIMO processing can be performed in a power efficient manner. In other words, the use of optical MIMO filters leads to a significant reduction of power consuming electronic DSP processing. Furthermore, the use of optical MIMO filters allows to avoid the optical path loss of mode splitters without increasing DSP processing effort.

It should be noted that the description and drawings merely illustrate the principles of the proposed methods and systems. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the proposed methods and systems and the concepts contributed by the inventors to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

The invention claimed is:

1. An optical processing system, the optical processing system comprising:
an interface to a multi-mode fiber at a first end of the optical processing system;
M first single-mode waveguides, M>2, coupled to the interface; wherein the first waveguides are arranged to carry M first optical signals, respectively; each of the M first single-mode waveguides carrying its respective first optical signal in a basic mode;
N second single-mode waveguides, N>1, at a second end of the optical processing system, wherein the second waveguides are arranged to carry N second optical signals, respectively, and wherein each of the N second single-mode waveguides carries its respective second optical signal in a basic mode, and wherein the N second optical signals are associated with N modes carried by the multi-mode fiber, respectively; and an optical processing core for transforming the first optical signals into the second optical signals such that a correlation between the second optical signals is decreased compared to a correlation between the first optical signals, wherein the optical processing core comprises two or more optical processing stages in sequence, each comprising one or more optical couplers arranged for processing one or more pairs of single-mode waveguides, respectively, thereby coupling some or all of the M first optical signals with one another, such that at least one of the N second optical signals is a linear combination of the some or all of the M first optical signals.

2. The optical processing system of claim 1, wherein an optical processing stage of the two or more optical processing stages is traversed by a plurality of single-mode stage waveguides, and wherein the plurality of stage waveguides are coupled to at least three of the M first waveguides at a first end of the optical processing stage and to at least one of the N second waveguides at a second end of the optical processing stage, and wherein the one or more couplers are arranged to mix two input optical signals on the two of the plurality of stage waveguides at a first end of the coupler using a rotation value θ to provide two coupled optical signals on the two of the plurality of stage waveguides at a second end of the coupler.

3. The optical processing system of claim 2, wherein if the two input optical signals and the two coupled optical signals are considered to form an x and y axis of a Cartesian coordinate system, the one or more optical couplers are arranged to perform a rotation of the two input optical signals by the rotation value θ to produce the two coupled optical signals.

4. The optical processing system of claim 2, wherein the first optical processing stage comprises a phase shifter on one of the plurality of stage waveguides arranged to shift a phase of an optical signal on the one of the plurality of stage waveguides by a phase value φ.

5. The optical processing system of any of claim 4, wherein the one or more phase values φ of the one or more phase shifters and/or the one or more rotation values θ of the one or more couplers, referred to as one or more parameters of the optical processing core, are adjustable.

6. The optical processing system of claim 5, further comprising a control unit arranged to determine the one or more parameters of the optical processing core; wherein the one or more parameters are determined based on the N second optical signals.

7. The optical processing system of claim 6, wherein
the N second optical signals are associated with training sequences transmitted via communication channels provided by the N modes of the multi-mode fiber; and
the control unit is arranged to determine the one or more parameters based on the training sequences and the N second optical signals.

8. The optical processing system of claim 1, wherein N>2;
the optical processing core comprises N−1 optical processing stages; and
each optical processing stage comprises M/2 or less couplers.

9. The optical processing system of claim 1, wherein
M is greater or equal to N; and/or
N is greater than 3 or 4 or 5 or 6 or 7 or 8 or 9 or 10.

10. The optical processing system of claim 1, wherein
the M first optical signals are associated with corresponding M samples of an optical field distribution at M different spatial positions on an endface of the multi-mode fiber, respectively; and
the N second optical signals represent the N modes carried by the multi-mode fiber.

11. The optical processing system of claim 10, wherein under the condition that the M samples are associated with an optical field distribution of a single one of the N spatial modes carried by the multi-mode fiber, the optical processing core is arranged to
combine the M first optical signals to a single one of the N second optical signals, and/or
generate the M first optical signals from a single one of the N second optical signals.

12. The optical processing system of claim 11, wherein, for each single one of the N spatial modes, the optical processing core is arranged to
combine the M first optical signals to a different single one of the N second optical signals; and/or
generate the M first optical signals from a different single one of the N second optical signals.

13. The optical processing system of claim 1, wherein
M is pair; and
the optical processing system further comprises M/2 polarization beam splitters arranged to generate the M first optical signals from M/2 polarization multiplexed signals and/or vice versa.

14. The optical processing system of claim 1, further comprising an optical receiver arranged to receive the N optical signals transmitted via N spatial modes of the multi-mode fiber, the N>1, the optical receiver comprising:
another optical processing system, arranged to process the M first optical signals to provide the N second optical signals, wherein the processing is performed subject to one or more parameters of one or more phase shifters and/or couplers comprised within the another optical processing system, and wherein the interface of the another optical processing system comprises a multi-mode fiber coupler arranged to extract the M first optical signals into the M single-mode waveguides from the multi-mode fiber, M≥N; and
N optical to electrical converters arranged to convert the N second optical signals into N corresponding received signals, wherein the one or more parameters are determined based on the N received signals.

15. The optical processing system of claim 1, further comprising an optical spatial mode multiplexer/demultiplexer arranged to couple the N second optical signals from the N second single-mode waveguides to N spatial modes of the multi-mode fiber and/or vice versa, the N>1, the spatial mode multiplexer/demultiplexer comprising another optical processing system, arranged to generate the M first optical signals from the N second optical signals and/or vice versa, wherein the interface of the another optical processing system comprises a spatial sampler arranged to generate M samples of an optical field distribution at M different spatial positions on an endface of the multi-mode fiber from the M first optical signals carried within the M first single-mode waveguides, M>1 and/or vice versa.

* * * * *